United States Patent
Guttahalli Krishna et al.

(10) Patent No.: US 9,355,052 B2
(45) Date of Patent: May 31, 2016

(54) DYNAMICALLY RESIZING DIRECT MEMORY ACCESS (DMA) WINDOWS

(71) Applicant: International Business Machines Corporation, Armonk, NY (US)

(72) Inventors: Anjan Kumar Guttahalli Krishna, Hyderabad (IN); Travis J. Pizel, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 145 days.

(21) Appl. No.: 13/974,460

(22) Filed: Aug. 23, 2013

(65) Prior Publication Data

US 2015/0058512 A1  Feb. 26, 2015

(51) Int. Cl.
*G06F 15/16* (2006.01)
*G06F 13/28* (2006.01)

(52) U.S. Cl.
CPC ............................... *G06F 13/28* (2013.01)

(58) Field of Classification Search
CPC ........ G09G 5/363; G06T 1/20; G06T 15/005; G06T 1/60; G06F 13/28; G06F 13/385; G06F 13/122; G06F 3/0632; G06F 3/0601; H04L 29/08549
USPC ......... 345/501, 502, 503, 505, 506, 519, 520, 345/522, 530; 710/1, 3, 4, 5, 8, 9, 12, 17, 710/20, 21, 22; 709/212; 711/100
See application file for complete search history.

(56) References Cited

U.S. PATENT DOCUMENTS

| | | | |
|---|---|---|---|
| 5,784,699 A * | 7/1998 | McMahon et al. ............ 711/171 |
| 7,366,798 B2 | 4/2008 | Nordstrom et al. | |
| 8,055,934 B1 * | 11/2011 | Blinick et al. ............... 714/4.11 |
| 8,386,679 B2 | 2/2013 | Nordstrom et al. | |
| 2006/0075146 A1 * | 4/2006 | Schoinas et al. ................. 710/3 |
| 2006/0143311 A1 * | 6/2006 | Madukkarumukumana et al. ................................ 710/1 |
| 2006/0277348 A1 * | 12/2006 | Wooten ............... G06F 12/1027 710/315 |
| 2007/0005572 A1 * | 1/2007 | Schluessler et al. .............. 707/3 |
| 2007/0168643 A1 * | 7/2007 | Hummel et al. .............. 711/207 |
| 2008/0010409 A1 * | 1/2008 | Rao et al. ...................... 711/118 |
| 2008/0082743 A1 | 4/2008 | Hanebutte et al. | |
| 2008/0133798 A1 | 6/2008 | Park et al. | |
| 2008/0235460 A1 | 9/2008 | Togawa | |
| 2009/0077341 A1 * | 3/2009 | Hamilton et al. ............. 711/171 |

FOREIGN PATENT DOCUMENTS

| EP | 1941362 A1 | 4/2007 |
|---|---|---|
| WO | 2007/042439 A1 | 4/2007 |

* cited by examiner

*Primary Examiner* — Xiao Wu
*Assistant Examiner* — Sarah Lyhmn
(74) *Attorney, Agent, or Firm* — Martin & Associates, LLC; Derek P. Martin

(57) ABSTRACT

A dynamic DMA window mechanism can resize DMA windows dynamically by increasing one DMA window at the expense of reducing a neighboring DMA window. The dynamic DMA window mechanism can decide to dynamically resize DMA windows based on a request from a system administrator, based on a request by an operating system device driver for an I/O adapter, or based on a performance monitor determining such a resizing would benefit system performance. Once one DMA window has been increased by allocating a portion of a donor DMA window, device drivers for the I/O devices corresponding to the two windows are updated to reflect the new DMA window sizes.

3 Claims, 7 Drawing Sheets

DYNAMICALLY RESIZING DIRECT MEMORY ACCESS (DMA) WINDOWS

BACKGROUND

1. Technical Field

This disclosure generally relates to computer systems, and more specifically relates to direct memory access (DMA) in computer systems.

2. Background Art

Computer systems typically use direct memory access (DMA) to move data between I/O devices and memory. Because the data may be moved without the processor moving the data, this frees up the processor for other tasks. DMA thus boosts system performance.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The IBM POWER Based Server computer system developed by IBM is an example of a computer system that supports logical partitioning. If logical partitioning on a IBM POWER Based Server computer system is desired, partition manager code (referred to as a "hypervisor" in IBM terminology) is installed that allows defining different computing environments (known as logical partitions) on the same platform. Once the partition manager is installed, logical partitions may be created that define different computing environments. The partition manager manages the logical partitions to assure that they can share needed resources in the computer system while maintaining the separate computing environments defined by the logical partitions.

In a logically partitioned computer system, I/O adapters may be virtualized to support the I/O operations needed in the various logical partitions. An address translation table is created to enable the hardware I/O adapter to perform DMA I/O operations to the memory of individual logical partitions. A DMA window is a defined region of I/O address space that correlates through address translation tables to regions of host system memory. The DMA window is what an I/O adapter and its corresponding device driver see as a continuous region of I/O address space that it can read from and write to during DMA operations.

U.S. Pat. No. 8,386,679 issued on Feb. 26, 2013 to Nordstrom et al., which is incorporated herein by reference, discloses a way to dynamically increase the size of a DMA window when there is additional expansion space that has been allocated for the I/O adapter. The Nordstrom system can only increase the size of a DMA window when expansion space has already been allocated to an I/O adapter, and otherwise cannot dynamically resize DMA windows.

BRIEF SUMMARY

A dynamic DMA window mechanism can resize DMA windows dynamically by increasing one DMA window at the expense of reducing a neighboring DMA window. The dynamic DMA window mechanism can decide to dynamically resize DMA windows based on a request from a system administrator, based on a request by an operating system device driver, or based on a performance monitor determining such a resizing would benefit system performance. Once one DMA window has been increased by allocating a portion of a DMA window, device drivers for the I/O devices corresponding to the two windows are updated to reflect the new DMA window sizes.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a way to dynamically resize DMA windows by reducing the size of one DMA window and making a corresponding increase in size of a neighboring DMA window. The dynamic DMA window mechanism can decide to dynamically resize DMA windows based on a request from a system administrator, based on a request by an operating system device driver, or based on a performance monitor determining such a resizing would benefit system performance. Once one DMA window has been increased by allocating a portion of a donor DMA window, device drivers for the I/O devices corresponding to the two windows are updated to reflect the new DMA window sizes.

Figure 1:
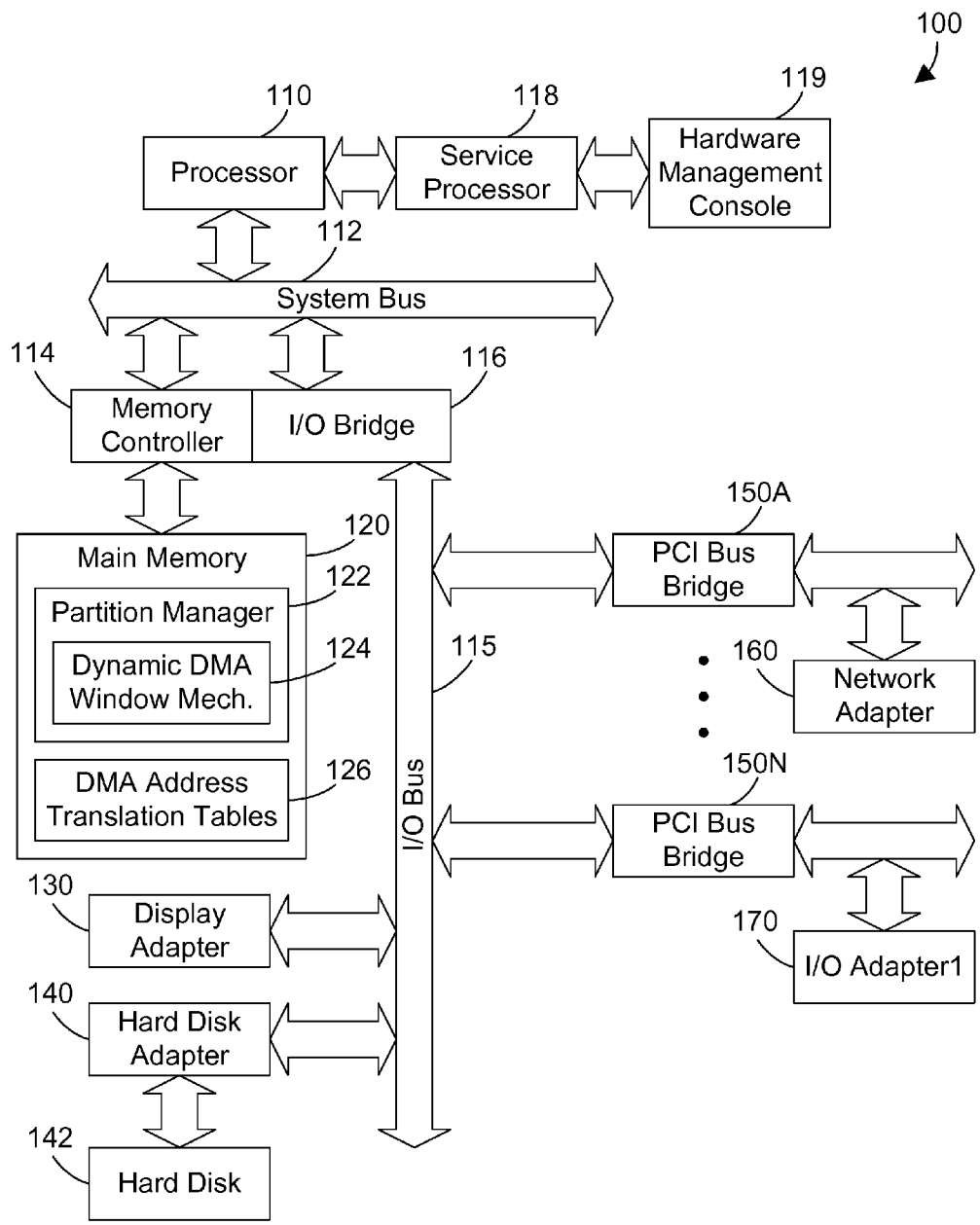
FIG. 1 is a block diagram of a computer system that includes a dynamic DMA window mechanism.

Referring to FIG. 1, a computer system 100 is one suitable implementation of a server computer system that includes a partition manager that includes a dynamic DMA window mechanism. Server computer system 100 is an IBM POWER Based Server computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110 coupled to a system bus 112, which in turn is coupled to a memory controller 114, an I/O bridge 116. The processor 110 is also coupled to a service processor 118. The memory controller 114 controls accesses to main memory 120, which contains a partition manager 122 that includes a dynamic DMA window mechanism 124. Partition manager 122 is a sophisticated program that contains low-level code to manage the resources of computer system 100. Main memory 120 also includes DMA address translation tables 126. DMA address translation tables 126 enable a hardware I/O adapter to perform DMA I/O operations to the memory of individual logical partitions by defining a DMA window that is a defined region of memory address space that correlates through the address translation tables 126 to regions of main memory 120.

The I/O bridge 116 is coupled to an I/O bus 115, which is coupled to a display adapter 130, a hard disk adapter 140, and multiple PCI bus bridges, shown in FIG. 1 as 150A, . . . , 150N. For the sake of illustration, PCI bus bridge 150A includes a connection to a network adapter 160, and PCI bus bridge 150N includes a connection to an I/O adapter 170. The I/O adapter 170 can be any suitable I/O adapter, including known I/O adapters and I/O adapters developed in the future. The hard disk adapter 140 is connected to a hard disk 142.

The service processor 118 may interrogate system processors, memory components, and I/O bridges to generate an inventory the computer system 100 under control of the hardware management console 119, which provides a user interface for testing the computer system and reporting results of the test. Service processor 118 may execute Built-In-Self-Tests (BISTs), Basic Assurance Tests (BATs), and memory tests on one or more of the elements in the computer system 100. Any error information for failures detected during the BIS Ts, BATs, and memory tests may be gathered and reported by service processor 118 to the hardware management console 119.

Computer system 100 utilizes well known virtual addressing mechanisms that allow the programs of computer system 100 to behave as if they only have access to a large, contiguous address space instead of access to multiple, smaller storage entities such as main memory 120 and local hard disk 140. Therefore, while partition manager 122 and DMA address translation tables 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes program instructions that make up the partition manager 122, which then manages the initialization of logical partitions on computer system 100.

Although computer system 100 is shown to contain only a single processor and a single system bus, those skilled in the art will appreciate that a dynamic partition manager may be practiced using a computer system that has multiple processors and/or multiple system buses. In addition, the interfaces that are used preferably each include separate, fully programmed microprocessors that are used to off-load compute-intensive processing from processor 110. However, those skilled in the art will appreciate that these functions may be performed using I/O adapters as well, such as I/O adapter 170.

Display adapter 130 is used to directly connect one or more displays to computer system 100. These displays, which may be non-intelligent (i.e., dumb) terminals or fully programmable workstations, are used to provide system administrators and users the ability to communicate with computer system 100. Note, however, that while display adapter 130 is provided to support communication with one or more displays, computer system 100 does not necessarily require a display, because all needed interaction with users and other processes may occur via network adapter 160.

Network adapter 160 is used to connect computer system 100 to other computer systems or workstations via a network. Network adapter 160 broadly represents any suitable way to interconnect electronic devices, regardless of whether the network comprises present-day analog and/or digital techniques or via some networking mechanism of the future. Network adapter 160 preferably includes a combination of hardware and software that allow communicating on the network. Software in the network adapter 160 preferably includes a communication manager that manages communication with other computer systems via the network using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network adapter 160. The I/O adapter 170 represents any suitable I/O adapter that could be used in computer system 100.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
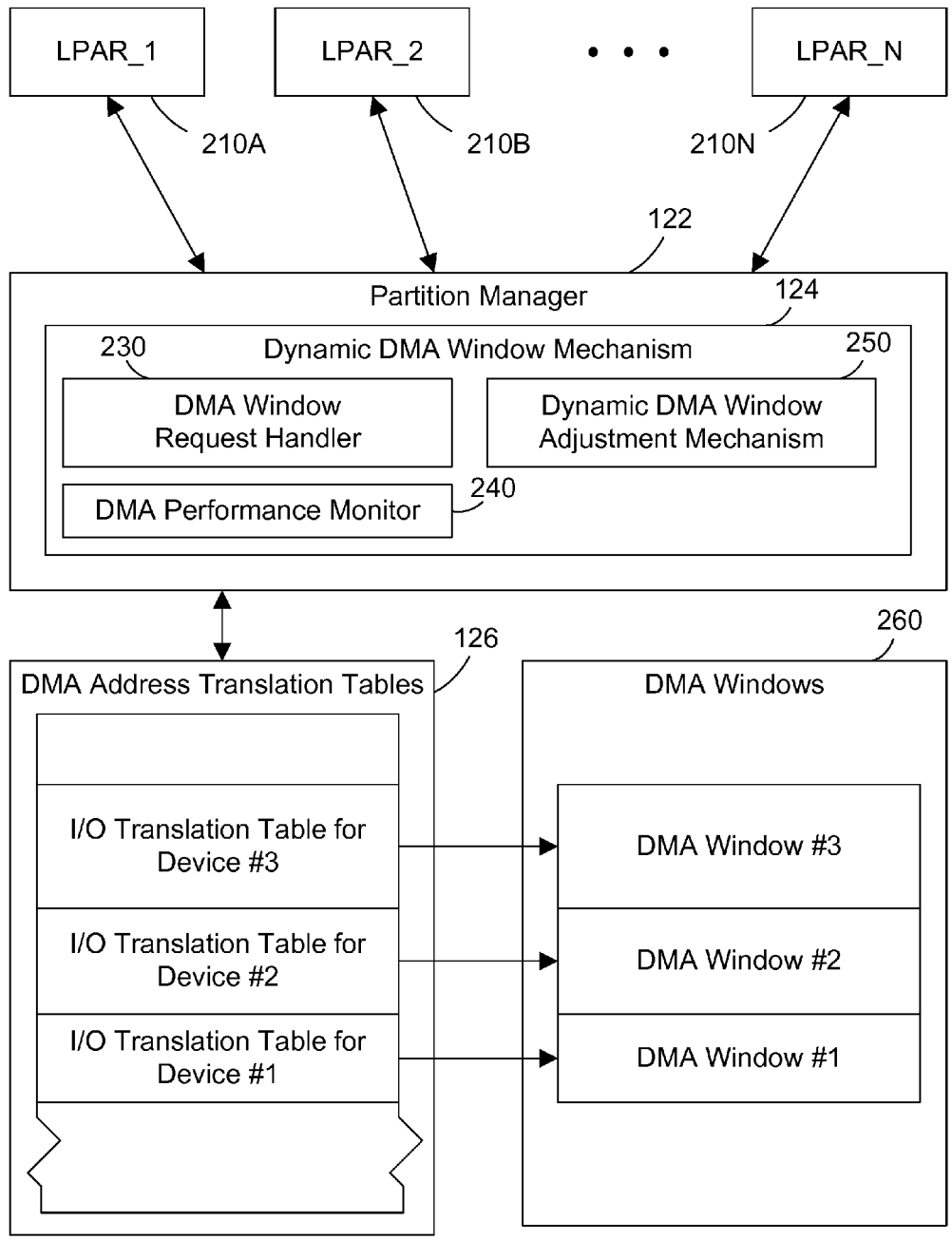
FIG. 2 is a block diagram showing a logical view of the partition manager 122 shown in FIG. 1 and its relationship to DMA address translation tables and DMA windows.

FIG. 2 shows a logical view of some of the features of computer system 100 in FIG. 1 Multiple logical partitions are defined, and are shown in FIG. 2 as LPAR_1 210A, LPAR_2 210B, ..., LPAR_N 210N. A logical partition typically specifies a portion of memory, along with an assignment of processor capacity and other system resources. Thus, one logical partition could be defined to include two processors, a portion of memory 120, and a network adapter. Another logical partition could be defined to include three other processors, a different portion of memory 120, and an I/O adapter. The partition manager enforces the logical separation between logical partitions so each logical partitions appears from a logical point of view to be a separate computer system.

The logical partitions 210A, 210B, ..., 210N are created and maintained by the partition manager 122. As shown in FIG. 1, the partition manager 122 includes a dynamic DMA window mechanism 124. Some details regarding the dynamic DMA window mechanism 124 are shown in FIG. 2. Dynamic DMA window mechanism 124 preferably includes a DMA window request handler 230, a DMA performance monitor 240, and a dynamic DMA window adjustment mechanism 250. The DMA window request handler 230 receives external requests to dynamically adjust DMA windows from a system administrator or from an operating system device driver for an I/O adapter. The DMA performance monitor 240 monitors DMA performance, and can automatically request the dynamic DMA window adjustment mechanism 250 dynamically adjust the size of DMA windows to increase DMA performance.

The partition manager 122 creates DMA address translation tables 126 that provide address translation (pointers) to corresponding DMA windows 260. Thus, an I/O translation table for device #3 points to a corresponding DMA window #3, as shown in FIG. 2. An I/O translation table for device #2 points to a corresponding DMA window #2. An I/O translation table for device #1 points to a corresponding DMA window #1.

Figure 3:
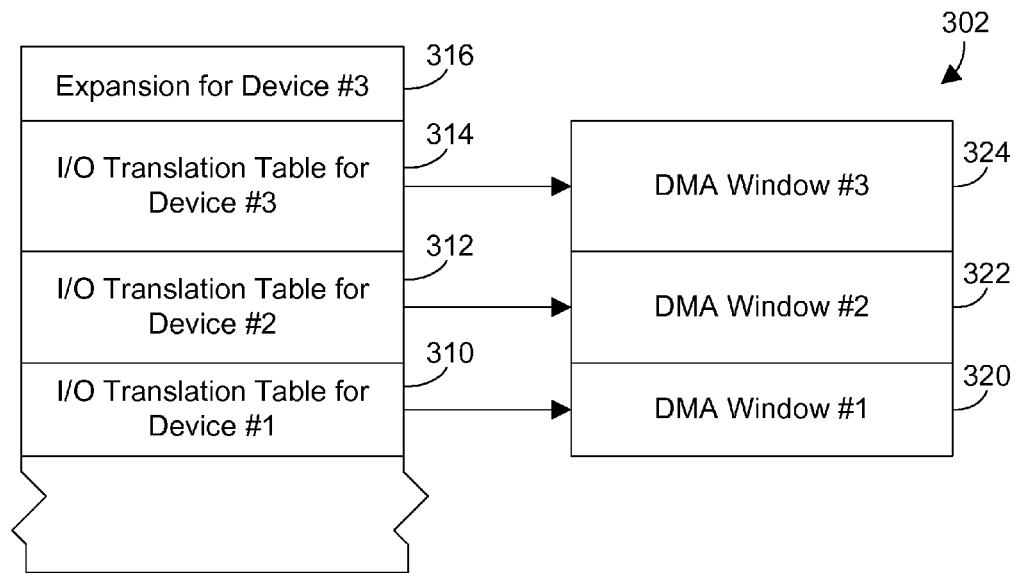
FIG. 3 shows DMA translation tables and corresponding DMA windows as known in the prior art.
Figure 4:
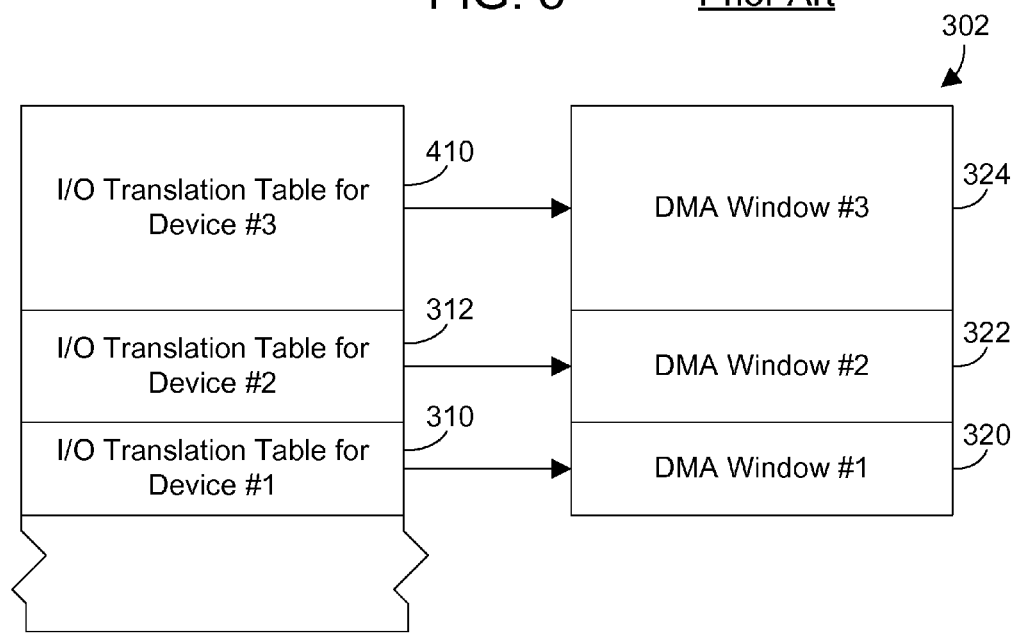
FIG. 4 is a table showing the dynamic increasing of the size of the I/O translation table for device #3 to use the expansion memory shown in FIG. 3.
Figure 5:
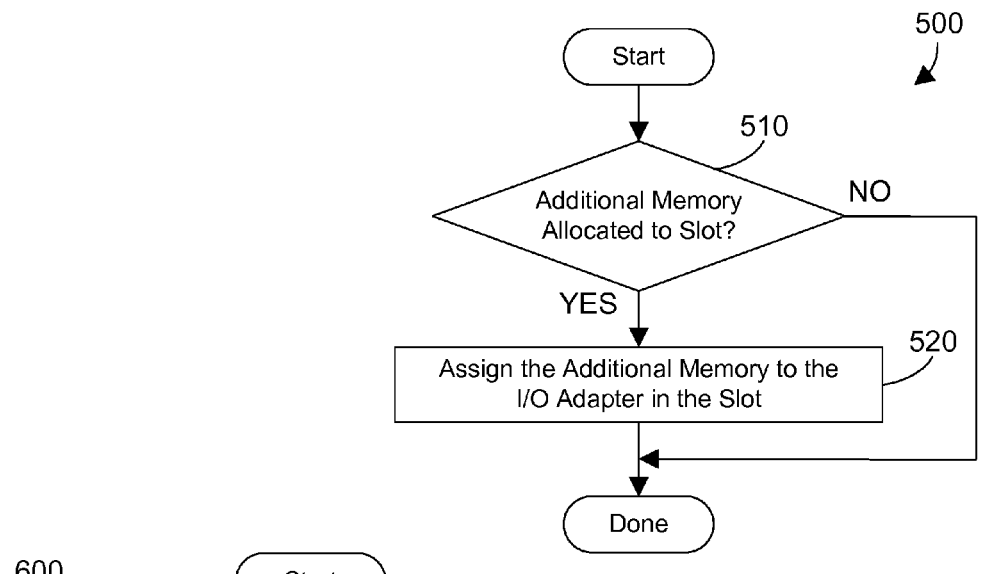
FIG. 5 is a flow diagram of a prior art method for dynamically increasing the size of a DMA window.

U.S. Pat. No. 8,386,679 shows one way to dynamically resize a DMA window. FIGS. 3-5 represent this prior art method. We assume for this simple example the I/O translation tables include an I/O translation table 310 for device #1, an I/O translation table 312 for device #2, an I/O translation table 324 for device #3, and an expansion memory 316 for device #3. We assume for this example each of the three translation tables 310, 312 and 314 define corresponding DMA windows 320, 322 and 324, respectively. Because I/O translation table 314 for device #3 has an expansion memory 316 allocated to device #3, the I/O translation table 314 for device #3 may be expanded as shown at 410 in FIG. 4 to include the expansion memory. Thus, the I/O translation table 410 for device #3 includes the memory in the previous I/O translation table 314 for device #3 plus the expansion memory 316 for device #3. The increase in the size of the I/O translation table 410 for device #3 causes a corresponding increase in the size of the corresponding DMA window 324, as shown in FIG. 4.

Referring to FIG. 5, the prior art method 500 determines when additional memory has been allocated to a slot (step 510=YES), then assigns the additional memory to the I/O adapter in the slot (step 520). Thus, the DMA window 324 can only be increased as shown in FIGS. 3 and 4 when the expansion memory 316 for device 3# has been allocated to device #3. This prior art patent does not allow increasing the size of a DMA window by a corresponding reduction in a neighboring DMA window.

Figure 6:
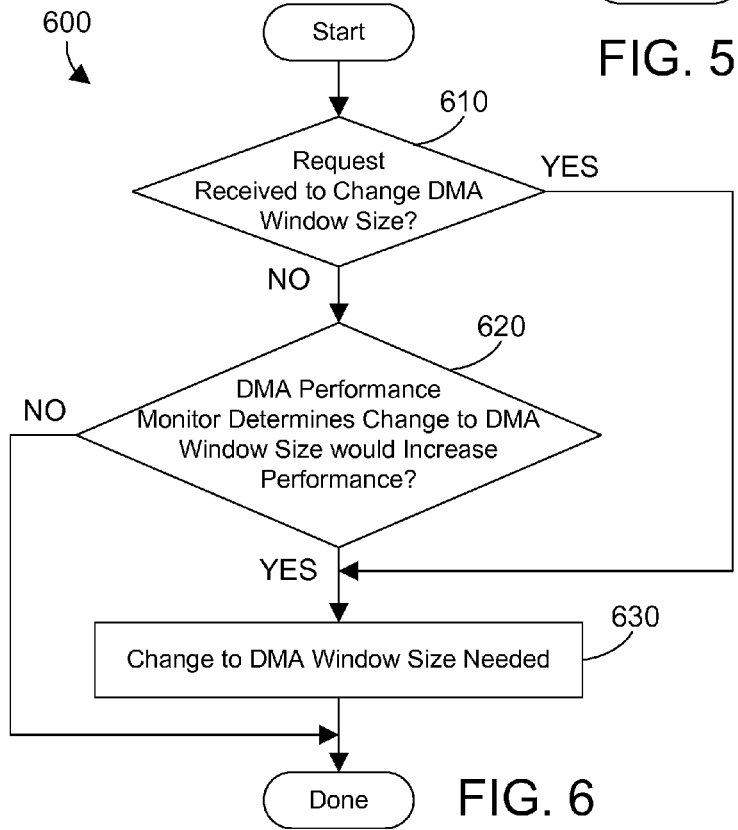
FIG. 6 is a flow diagram of a method for determining when a change in DMA window size is needed.

Referring to FIG. 6, a method 600 determines when a change to a DMA window size is needed. When a request is received to change the DMA window size (step 610=YES), a change to the DMA window size is needed (step 630). A request could be received in step 610, for example, from a system administrator or from an operating system device driver corresponding to an I/O adapter. Even when no request to change the DMA window size is received (step 610=NO), the DMA performance monitor (240 in FIG. 2) may determine that a change to DMA window size would increase DMA performance (step 620=YES), in which case a change to the DMA window size is needed (step 630). No change to the DMA windows size is needed when no request is received to change the DMA window size (step 610=NO) and when the DMA performance monitor does not determine a change to DMA window size would increase performance (step 620=NO).

Figure 7:
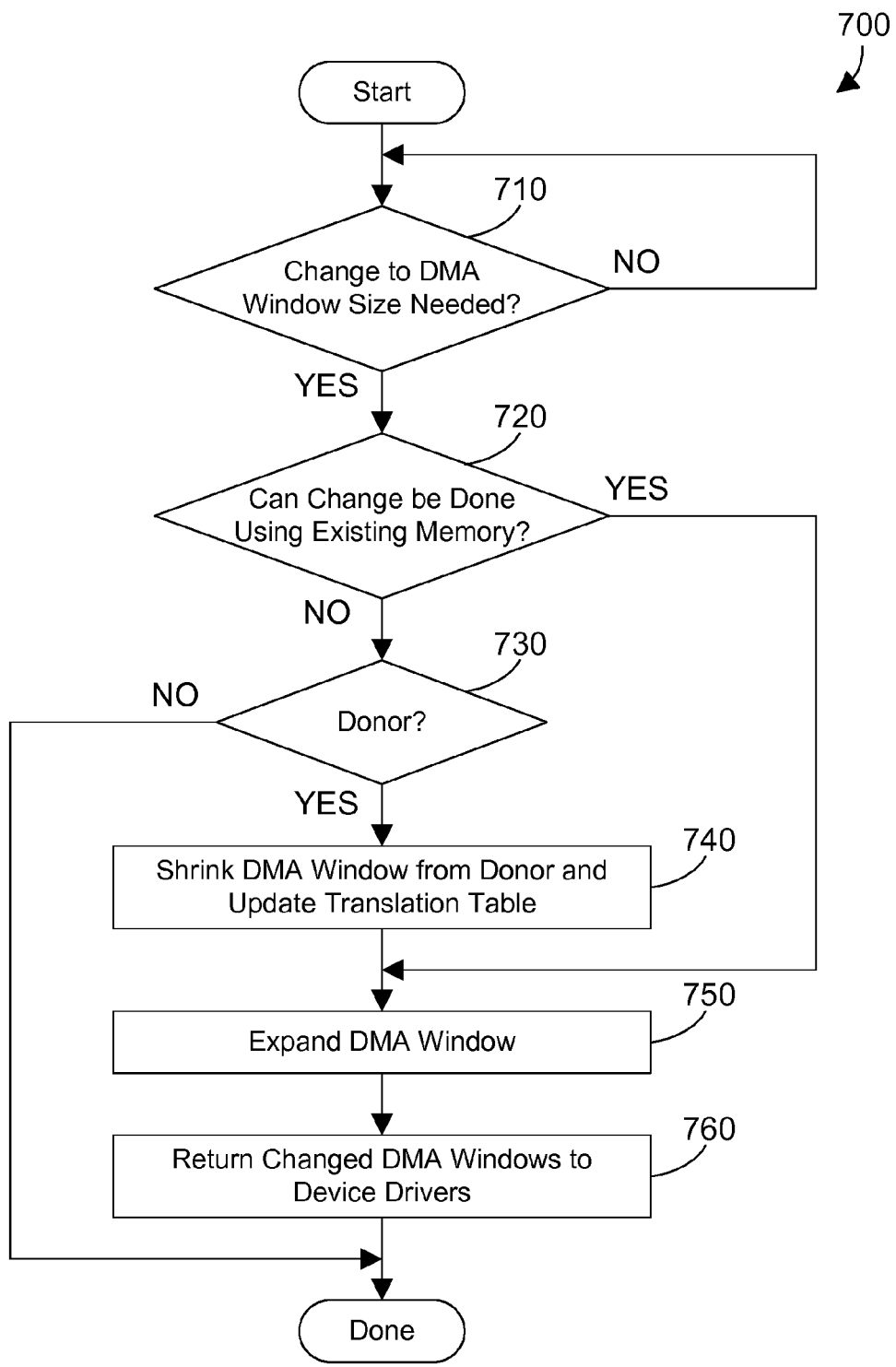
FIG. 7 is a flow diagram of a method for dynamically resizing DMA windows.

Referring to FIG. 7, a method 700 begins by determining whether a change to the DMA window size is needed (step 710). If not (step 710=NO), method 700 loops back until a change to the DMA window size is needed (step 710=YES). Method 600 in FIG. 6 is one suitable way to determine when a change to DMA window size is needed in step 710 in FIG. 7. When a change to DMA window size is needed (step 710=YES), a determination is made regarding whether the change can be done using existing memory (step 720). If so (step 720=YES), the DMA window is expanded (step 750), and the changed DMA windows are returned to the device drivers of the corresponding I/O devices (step 760). Note that one suitable implementation for steps 720=YES, 750 and 760 is in the prior art U.S. Pat. No. 8,386,679 referenced above. Thus, a change can be done using existing memory (step 720=YES) when expansion memory has already been allocated to an I/O device, and that I/O device needs its DMA window size increased.

When the change to DMA window size cannot be done using existing memory (step 720=NO), method 700 determines whether there is donor window (step 730). In other words, method 700 determines whether one of the DMA windows can be reduced so a corresponding increase in the size of a different DMA window can be made. When there is a suitable donor DMA window (step 730=YES), the DMA window of the donor is shrunk and the translation table for the donor is updated to reflect the shrinkage (step 740). The DMA window that needs to be increased may then be expanded (step 750) by taking the portion of the DMA window of its neighbor that was shrunk. The changed DMA windows are then returned to the device drivers of the corresponding I/O devices (step 760). This means the device driver for the I/O adapter for the shrunk DMA window receives a shrunk DMA window while the device driver for the I/O adapter for the expanded DMA window receives the expanded DMA window.

Figure 8:
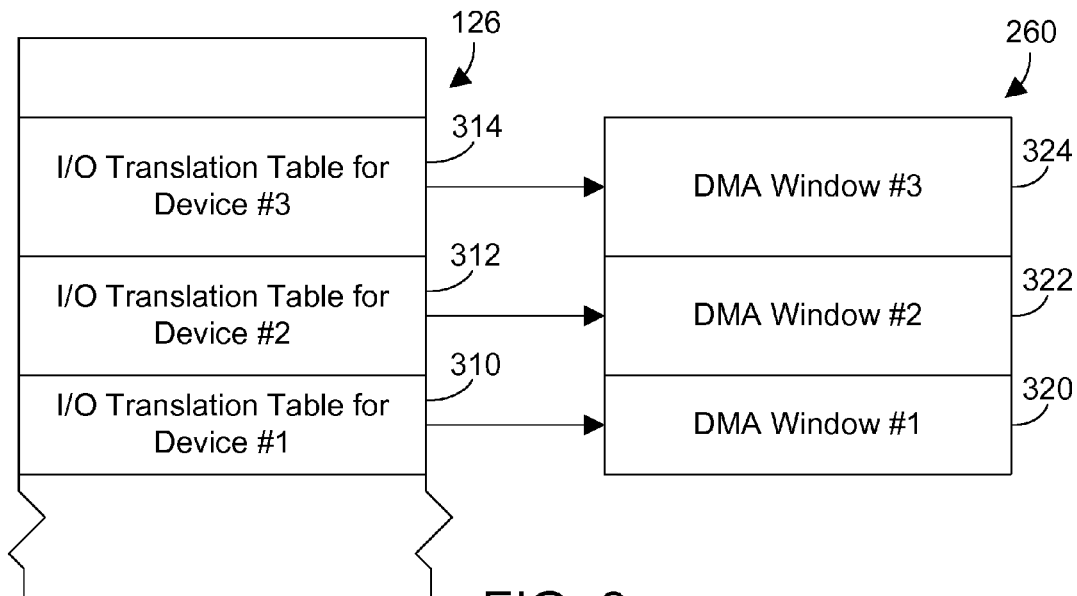
FIG. 8 shows translation tables and corresponding DMA windows.
Figure 9:
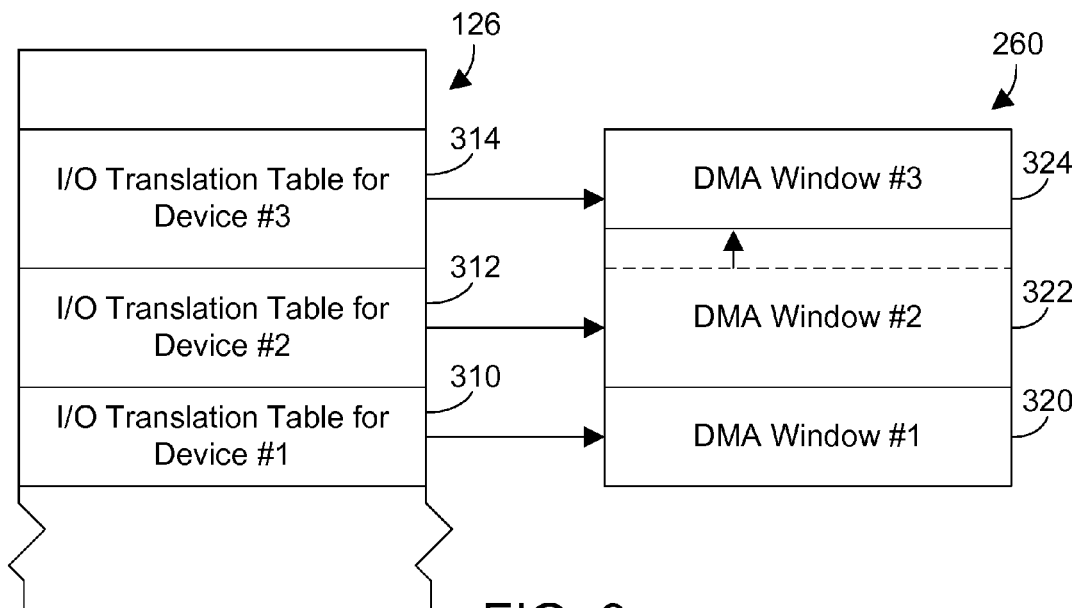
FIG. 9 shows resizing DMA windows #2 and #3 by decreasing the size of donor DMA window #3 and making a corresponding increase in the size of DMA window #2.
Figure 10:
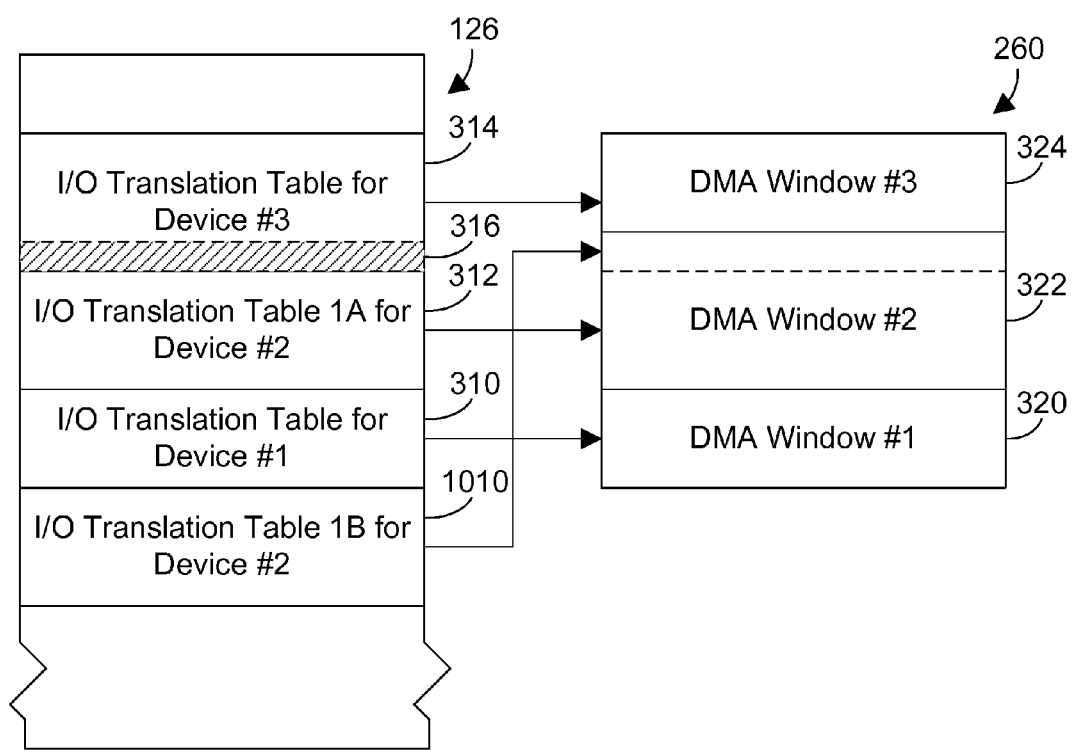
FIG. 10 shows non-contiguous address translation tables that correspond to contiguous DMA windows.

A simple example is presented in FIGS. 8-10 to illustrate the operation of method 700 in FIG. 7. We start in FIG. 8 with I/O translation tables 310, 312 and 314 that define corresponding DMA windows 320, 322 and 324. Referring to FIG. 9, we assume DMA window #3 is a donor (step 730=YES in FIG. 7), which means DMA performance may be enhanced by reducing DMA window #3 324 by some amount, and by expanding DMA window #2 322 by the same amount. Referring to FIG. 10, a portion of the I/O translation table 314 that used to point to the portion of DMA window #3 324 that has shrunk is invalidated, as shown by the shaded portion 316 in FIG. 10. The I/O translation table 310 for device #1 remains unchanged. The I/O translation table for device #2 is changed by including the original portion 312 along with an additional portion 1010 that corresponds to the expanded portion that was taken from DMA window #3 324. Thus, translation table 1010 points to the expanded portion of the DMA window #2 322, as shown in FIG. 10. This example illustrates that although the DMA windows must be a contiguous block of addresses in I/O address space given to a device driver for an I/O adapter, the translation tables need not be contiguous. As a result, it is possible to shrink one DMA window while expanding a different DMA window, as shown in the example in FIGS. 8-10. While the example shown in FIGS. 8-10 may appear to illustrate shrinking one DMA window and expanding an adjacent DMA window, the principle described herein with reference to FIGS. 8-10 could be applied to shrinking any donor DMA window and allocating that portion to a different DMA window. In other words, instead of growing DMA Window #2 322 as shown in FIG. 10, DMA Window #1 320 could be grown by the same amount that DMA Window #3 was shrunk. The disclosure and claims herein extend to taking any portion of a donor DMA window and allocating that portion to a different DMA window.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claims and disclosure herein provide a way to dynamically resize DMA windows by reducing the size of one DMA window and making a corresponding increase in size of a neighboring DMA window. The dynamic DMA window mechanism can decide to dynamically resize DMA windows based on a request from a system administrator, based on a request by an operating system device driver for an I/O adapter, or based on a performance monitor determining such a resizing would benefit system performance. Once one DMA window has been increased by allocating a portion of an donor DMA window, device drivers for the I/O devices corresponding to the two windows are updated to reflect the new DMA window sizes.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer system comprising:
   at least one processor;
   a memory coupled to the at least one processor;
   a plurality of address translation tables in the memory that point to a corresponding plurality of direct memory access (DMA) windows, each of the plurality of DMA windows defining a contiguous block of addresses for a device driver of a corresponding I/O device; and
   a dynamic DMA window mechanism that determines when a change to a window size of a specified one of the plurality of DMA windows is needed when at least one of the following occurs:
      when a request is received from a system administrator to increase the window size of the specified DMA window;
      when a request is received from an operating system device driver for an I/O adapter corresponding to the specified DMA window to increase the window size of the specified DMA window; and when a DMA performance monitor determines performance of the computer system can be increased by increasing the window size of the specified DMA window;

in response to determining the change to the window size of the specified DMA window is needed, the dynamic DMA window mechanism identifies a donor DMA window that is adjacent to the specified DMA window, dynamically shrinks the donor DMA window by a specified block, dynamically increases the specified DMA window to use the specified block that was formerly in the donor DMA window, invalidates a portion of at least one of the plurality of contiguous address translation tables that used to point to the specified block that was formerly in the donor DMA window, creates a new address translation table distinct from the plurality of contiguous address translation tables corresponding to the specified DMA window to point to the specified block, returns to a device driver of an I/O device that corresponds to the donor DMA window an address range corresponding to the shrunk donor DMA window, and returns to a device driver of an I/O device that corresponds to the specified DMA window an address range corresponding to the increased specified DMA window.

2. The computer system of claim 1 wherein the computer system is a logically partitioned computer system.

3. The computer system of claim 2 wherein the dynamic DMA window mechanism operates on a plurality of logical partitions on the logically partitioned computer system.

* * * * *